No. 738,513. PATENTED SEPT. 8, 1903.
J. H. BAKER, G. F. SHEVLIN & F. H. BAKER.
DEVICE FOR OILING AND COOLING THE BEARINGS OF VERTICAL SHAFTS.
APPLICATION FILED JAN. 17, 1902.
NO MODEL. 2 SHEETS—SHEET 1.
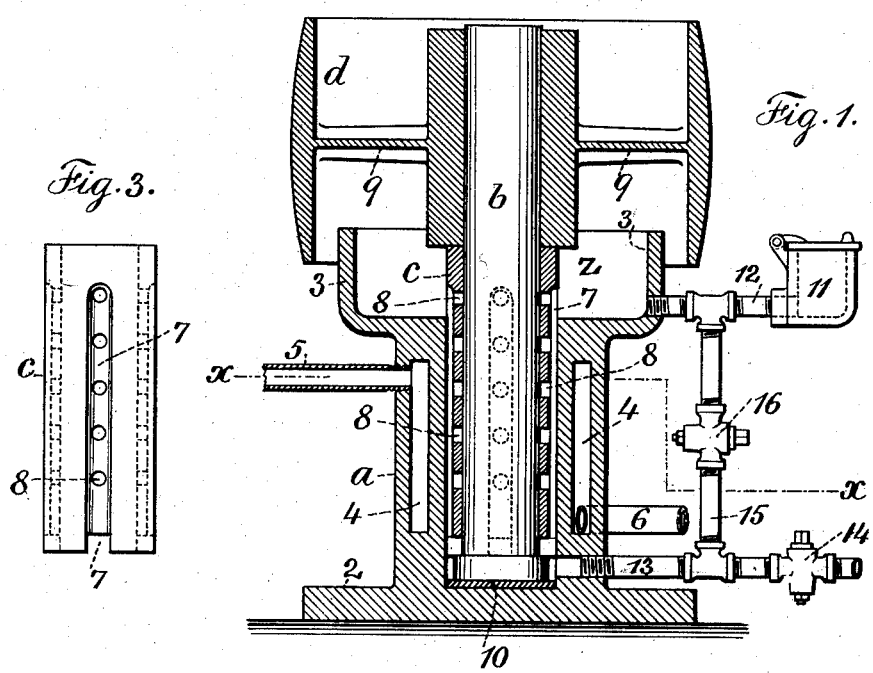
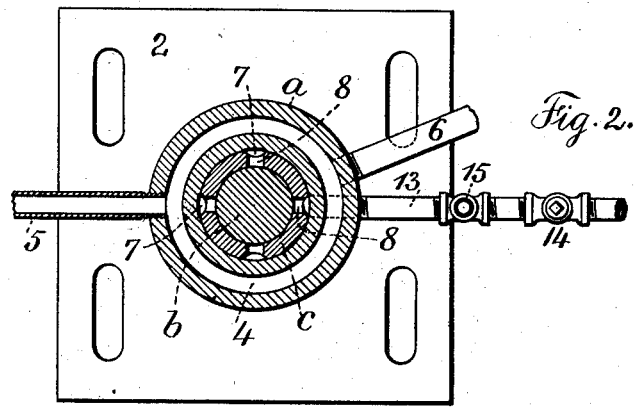
Witnesses:
J. Staib
Chas. H. Smith
Inventors:
James H. Baker
George F. Shevlin
Frederick H. Baker
per L. W. Serrell & Son
Attys.

No. 738,513. PATENTED SEPT. 8, 1903.
J. H. BAKER, G. F. SHEVLIN & F. H. BAKER.
DEVICE FOR OILING AND COOLING THE BEARINGS OF VERTICAL SHAFTS.
APPLICATION FILED JAN. 17, 1902.
NO MODEL. 2 SHEETS—SHEET 2.
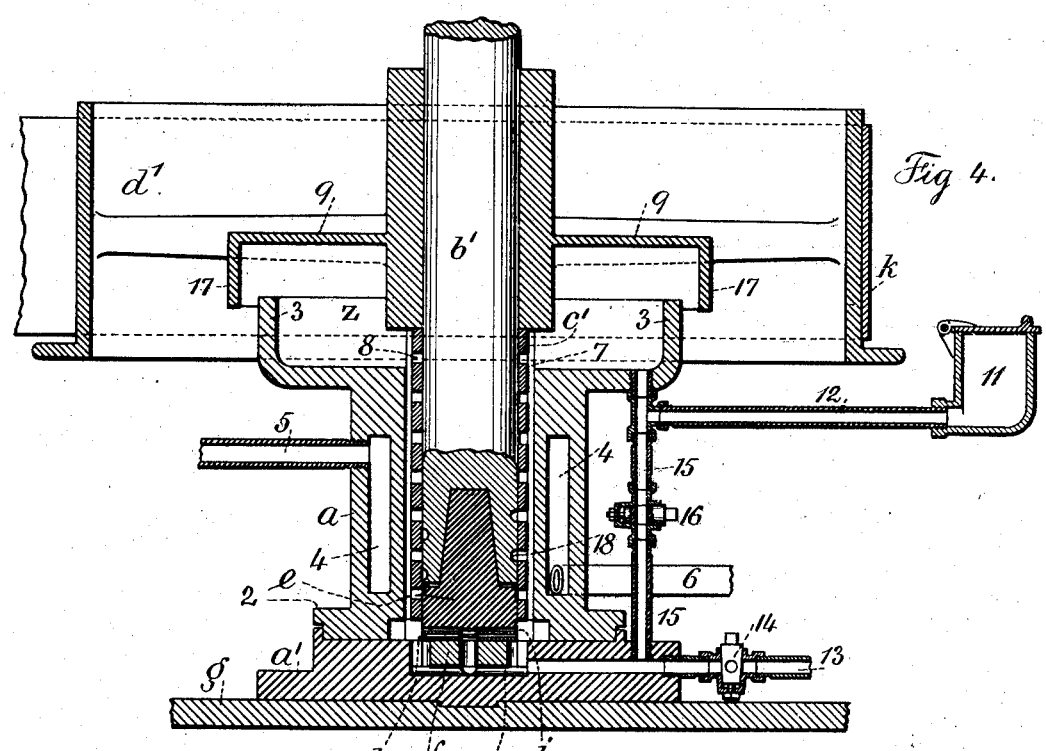
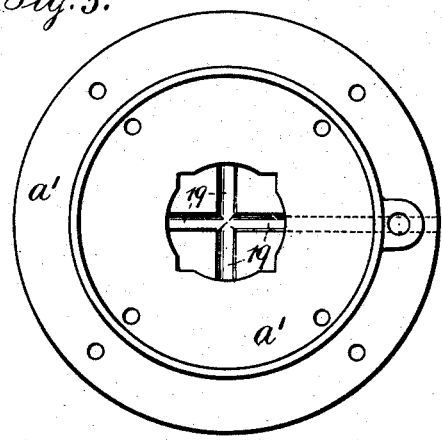
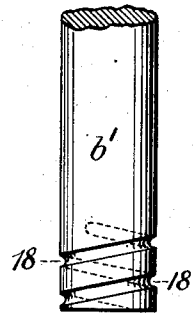
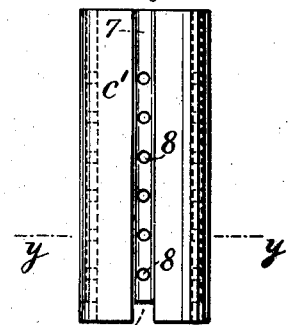
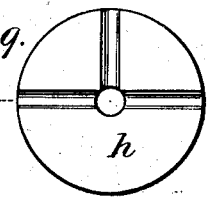
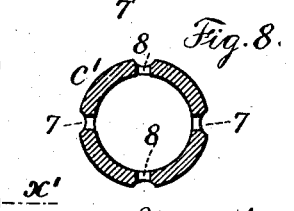
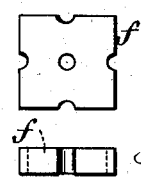
Witnesses:
J. Staib
Chas H Smith
Inventors:
James H. Baker
George F. Shevlin
Frederick H. Baker
per L. W. Sursell & Son attys.
THE NORRIS PETERS CO., PHOTO-LITHO., WASHINGTON, D. C.

No. 738,513. Patented September 8, 1903.

UNITED STATES PATENT OFFICE.

JAMES H. BAKER, GEORGE F. SHEVLIN, AND FREDERICK H. BAKER, OF SARATOGA SPRINGS, NEW YORK, ASSIGNORS TO BAKER AND SHEVLIN COMPANY, OF SARATOGA SPRINGS, NEW YORK, A CORPORATION OF NEW YORK.

DEVICE FOR OILING AND COOLING BEARINGS OF VERTICAL SHAFTS.

SPECIFICATION forming part of Letters Patent No. 738,513, dated September 8, 1903.

Application filed January 17, 1902. Serial No. 90,208. (No model.)

*To all whom it may concern:*

Be it known that we, JAMES H. BAKER, GEORGE F. SHEVLIN, and FREDERICK H. BAKER, citizens of the United States, residing at Saratoga Springs, in the county of Saratoga and State of New York, have invented a new and useful Improvement in Devices for Oiling and Cooling the Bearings of Vertical Shafts, of which the following is a specification.

Our invention is an improvement upon a part of the structure shown and described in Letters Patent granted to us November 19, 1901, No. 686,962.

Our invention relates to improvements in devices for oiling and cooling the lower bearing ends of vertical shafts, having special reference to the shafts of rapidly-moving devices, such as pulleys, centrifugal pulp-screens, and centrifugal creamers. In connection with this we aim to effect a circulation of the oil around the lower bearing end of the shaft, to be able to draw away the thickened oil containing foreign particles, such as dirt, and also to prevent dust and foreign particles lodging in the oil as far as possible.

The part or casting receiving the lower end of the vertical shaft is hollow, or, in other words, made with an annular recess and may be made in one or two parts. It is provided with a rising flange, preferably of larger diameter across than the diameter of the casting or base. A bushing surrounds the shaft within the casting, and the bushing is of peculiar construction. A pulley is mounted upon the shaft above the bushing, and the pulley is so constructed as to cover, or, in other words, partially inclose the rising flange of the casting, so as to prevent foreign substances getting within said rising flange, which forms a receptacle for oil. Water circulates through the hollow casting to keep the shaft and bushing cool. The shaft rests on a steel block in the base of the casting, and we provide an oil-cup, a pipe therefrom into the oil-receptacle at the upper end of the casting, a pipe connected to the base of the casting, and a pipe extending between the two. The lower pipe forms a discharge-pipe and is provided with a cock, and the vertical pipe between the supply from the oil-cup and the discharge is also provided with a cock, and we prefer to provide the lower end of the shaft with a spiral groove, and, further, to provide steel disks between the steel block in the base of the casting and the lower end of the shaft or step. These parts are peculiarly made not only for receiving and holding the oil, but for causing a circulation of the oil and in order that the friction may be reduced to a minimum.

In the drawings, Figure 1 is a vertical section; Fig. 2, a sectional plan at $x\ x$, and Fig. 3 an elevation of the bushing alone, illustrating the simpler form of our invention. Fig. 4 is a vertical section illustrating the approved form of our invention. Fig. 5 is a plan of the lower part of the step-casting. Fig. 6 is an elevation of the lower end of the shaft. Fig. 7 is an elevation of the bushing. Fig. 8 is a sectional plan of the bushing at $y\ y$ of Fig. 7. Fig. 9 is a plan, and Fig. 10 a cross-section at $x'\ x'$ of Fig. 9, representing one of the disks. Fig. 11 is a plan, and Fig. 12 an elevation, representing the steel block employed in the base of the step-casting.

Referring particularly to Figs. 1 to 3, inclusive, $a$ represents the hollow step or shaft casting, provided at its lower end with a flange 2, preferably perforated for bolts, by which the same may be secured to a suitable foundation. The upper end of the casting $a$ is broadened and provided with a rising flange 3, which forms an oil-receptacle at the upper end of the casting. In this casting is an annular recess 4. Entering the casting at the upper portion of the recess 4 is an inlet-pipe 5 for water, and at the opposite side entering the lower portion of the recess is an exit-pipe 6 for water, and it is our purpose in the use of this device to keep a constantly-running stream of water in the pipe 5 through the recess 4 and out of the pipe 6, so that the casting $a$ and the shaft $b$ and bushing $c$, received in the open center of said casting $a$, may be kept cool, it being a fact that said casting is liable to heat up on account of the high speed of rotation of the shaft. The bushing $c$ surrounds the shaft. It is preferably of a tough homogeneous non-frangible metal, such as bronze. It is preferably provided with longitudinal grooves 7, which occupy a vertical position in the normal relation of the bushing. These grooves are cut through the bushing at their lower ends, and in the grooves the bushing is provided with series of numerous perforations 8.

The structure shown in Figs. 1 to 3, inclusive, has special reference to a loose pulley. The pulley $d$ is keyed on the shaft, and between the respective arms of the pulley we provide webs 9. These completely fill in the pulley between the arms, the web, and the rim, and the pulley is advantageously placed, so that the lower edge of the rim comes below the upper edge of the rising flange 3 of the casting $a$, thus covering over the oil-receptacle and serving to a considerable extent to prevent the ingress of foreign matter into the oil-receptacle to mix with the oil, and so interfere with its proper working and circulation.

In the base of the casting is a steel block 10, upon which the lower end of the shaft $b$ rests.

11 represents an oil-cup on the outer end of the pipe 12. This pipe passes through the flange 3 and communicates with the oil-receptacle $z$. A hole is provided through the lower end of the casting $a$, into which the pipe 13 is secured. This pipe 13 is provided with a cock 14, and there is a vertical pipe 15, connecting with and extending between the pipes 12 and 13, respectively, and in this pipe 15 there is a cock 16. It will be noticed in Fig. 1 that the upper end of the oil-cup 11 is approximately on a level or slightly above the upper end of the bushing $c$, and in the operation of the device the oil-cup 11, the pipes 12, 13, and 15, and the central opening in the casting around the lower end of the shaft and the openings in the bushing and the receptacle $z$ are all filled with oil up to a level with the oil in the oil-cup. In filling in this oil the cock 14 must be closed and the cock 16 must be opened, and in the operation the high-speed rotary movement of the shaft has a tendency to raise the oil around the shaft up into the receptacle $z$, the return movement of the oil being through the pipes 12, 15, and 13 to the base of the shaft, and any dirt or sediment finds its way to the base of the shaft. When it is desired to clean out the parts and remove the oil, with the sediment, the cock 16 is closed and the cock 14 opened, when the reverse movement takes place, the oil flowing from the oil-cup 11 through the pipe 12 into the receptacle $z$, down around the bushing and the shaft, and away through the pipe 13, washing out foreign substances and the thick oil, so that thereafter fresh oil can be introduced through the oil-cup in the manner hereinbefore described.

The device shown in Figs. 1 to 3, inclusive, is specially adapted for the vertical shafts of loose pulleys and in places where there is no appreciable weight carried by the shaft, whereas the preferred form of the invention (shown in Figs. 4 to 12, inclusive) has special reference to the shafts of centrifugal pulp-screens, centrifugal creamers, and similar devices where there is not only a high speed maintained, but a considerable weight carried by the shaft. Referring to Figs. 4 to 12, inclusive, the shaft $b'$ is provided with a steel step $e$ at the lower end, of hardened metal, adapted to withstand continuous hard use. The lower end of the shaft above the step is provided with a spiral groove 18. The bushing $c'$, surrounding the shaft and within the hollow base or casting $a$, is similar to the bushing $c$, (shown in Figs. 1 to 3, inclusive,) except in the present case the longitudinal grooves 7 may be continued throughout the whole length of the bushing instead of, as shown in Figs. 1 and 3, for the greater portion of the length. The pulley $d'$ receives the belt $k$, employed for driving the same and the shaft $b'$, and this pulley is of appreciable size, and the web 9, formed therewith and between the arms, extends out from the hub of the pulley and is provided with a hood 17, integral with the pulley, arms, and web, and extending down from the web to surround the rising flange 3 and inclose the oil-receptacle at the upper end of the casting.

In the device, Figs. 4 to 12, inclusive, the casting is in two parts—an upper part $a$ and a lower portion $a'$, into which the upper part is received—the two parts being advantageously bolted together and the lower part $a'$ resting upon a bed-plate $g$, to which the same is advantageously connected by bolts. At the center of the lower part $a'$ is formed a recess to receive the steel block $f$. This steel block is square in plan, is provided with a central hole, and with approximately semicircular recesses across the edges and at about the center, and the recess in the center of the base $a'$ receives this steel block $f$, there being corners that exactly fit the block, the sides, however, between the corners being cut away, so as to form between the same and the steel block when in place suitable openings, which coact with the recesses in the edges of the steel block and with X-grooves 19 in the lower face of said recess to provide ways for the movement of the lubricating-oil. This lower portion $a'$ is provided with a hole in line with the oil-pipe 13 and communicating with the grooves 19 and to which lower part said oil-pipe is connected, and the vertical oil-pipe 15 passes down into the lower part $a'$ and intersects the said hole.

We employ steel disks $h$ and $i$ between the upper face of the steel block $f$ and the lower face of the step $e$. These disks are preferably provided with convex faces, one surface being grooved, as shown, and the disks centrally perforated. In this structure it will be noticed that the weight is carried by hardened portions or devices provided especially to withstand wear, that a minimum of contacting surfaces are also provided in an effort to reduce the friction to a minimum; also, that the structure described permits the free passage of oil between, within, and around the parts for lubricating the same, and the spiral groove 18 in the lower end of the shaft performs the office of imparting an upward movement to the lubricating-oil, so that the same flows up around the shaft and the bushing into the oil-receptacle $z$ and returns by the pipe 15 and the hole in the base $a'$, which forms a prolongation of the pipe 13.

The cooling devices, the oil holding and feeding as well as the cleaning functions of the preferred form of the device shown in Figs. 4 to 12, inclusive, are generically the same as the structures shown and described with reference to Figs. 1 to 3, inclusive. With these structures it is not only possible to provide a continuous circulation of water for maintaining the shaft and bushing in a cool condition to prevent heating, but to provide a supply of oil adapted to last for a long period and to insure a circulation of such oil, so that all of the moving and contacting parts are thoroughly lubricated, and, further, the possibility of removing foreign substances with the oil and cleaning the parts and thereafter introducing a fresh supply of oil for lubricating purposes.

We claim as our invention—

1. The combination with a vertically-supported shaft, of a base receiving the same and having at its upper end a receptacle for oil, pipes connected to the upper end and to the lower end of such base, and a pipe intermediate thereto and forming a connection therefor whereby a quantity of oil fills the said base around the shaft and the said pipes and part of the said receptacle, a receptacle for supplying and valves for regulating the oil, substantially as set forth.

2. The combination with a vertically-supported shaft, of a base receiving the same and having at its upper end a receptacle for oil, devices connected to the upper end and to the lower end of such base, and coacting devices intermediate thereto whereby a quantity of oil fills the said base around the shaft and the said devices and part of the said receptacle, and means for supplying and regulating the oil, and a pulley secured upon the shaft above the said base, and means connected to and formed with the pulley for covering over the oil-receptacle to keep out foreign substances, substantially as set forth.

3. The combination with a vertically-supported shaft, of a base receiving said shaft and formed hollow by an annular recess and having at its upper end a receptacle for oil, inlet and exit pipes for cooling-water connecting with said annular recess, devices connected to the upper end and to the lower end of such base and coacting devices intermediate thereto whereby a quantity of oil fills the said base around the shaft and the said devices and part of the said receptacle, and means for supplying and regulating the oil, substantially as set forth.

4. The combination with a vertically-supported shaft, of a base receiving said shaft and formed hollow by an annular recess and having at its upper end a receptacle for oil, inlet and exit pipes for cooling-water connecting with said annular recess, devices connected to the upper end and to the lower end of such base and coacting devices intermediate thereto whereby a quantity of oil fills the said base around the shaft and the said devices and part of the said receptacle, and means for supplying and regulating the oil, and a pulley secured upon the shaft above the said base, and means connected to and formed with the pulley for covering over the oil-receptacle to keep out foreign substances, substantially as set forth.

5. The combination with a vertically-supported shaft, of a base or casting adapted to receive the same and spread at its lower end for connection to a foundation, and also spread at its upper end and provided with a rising flange to form an oil-receptacle, a bushing surrounding said shaft and with the shaft received in the base or casting, said bushing being provided with longitudinal surface grooves and perforations therein in the grooves, an oil cup and pipe extending therefrom and passing through the flange into the oil-receptacle, a pipe passing into a hole in the base or the casting adjacent to the lower end of the shaft and a pipe connecting the before-mentioned pipes, regulating-cocks in the lower and in the connecting pipes whereby oil is supplied around the shaft and bushing into the oil-receptacle and the said pipes, a circulation being maintained by the rotation of the shaft and whereby the oil may be withdrawn with any foreign material from the lowermost pipe, substantially as set forth.

6. The combination with a vertically-supported shaft, of a base or casting adapted to receive the same and spread at its lower end for connection to a foundation and also spread at its upper end and provided with a rising flange to form an oil-receptacle, a bushing surrounding said shaft and with the shaft received in the base or casting, said bushing being provided with longitudinal surface grooves and perforations therein in the grooves, an oil cup and pipe extending therefrom and passing through the flange into the oil-receptacle, a pipe passing into a hole in the base of the casting adjacent to the lower end of the shaft and a pipe connecting the before-mentioned pipes, regulating-cocks in the lower and in the connecting pipes whereby oil is supplied around the shaft and bushing into the oil-receptacle and the said pipes, a circulation being maintained by the rotation of the shaft and whereby the oil may be withdrawn with any foreign material from the lowermost pipe, and a pulley mounted upon the shaft above the base, webs cast with the pulley and between the arms and a depending portion of the pulley in the form of a hood surrounding the rising flange of the base as a cover to prevent foreign materials entering the oil-receptacle, substantially as set forth.

7. In a device for oiling and cooling the bearings of vertical shafts, the combination with the shaft and the cast base of a bushing surrounding the shaft within the base or casting and provided with spaced-apart longitudinal surface grooves and perforations through the bushing from the bases of the grooves, and means for supplying oil around the shaft and bushing and in the grooves and perforations thereof, and means connected with and formed in the lower end of the shaft for creating an upward circulation of the oil from the lower end of the shaft, up around the same and through the bushing, and a receptacle for oil adjacent to the upper end of the bushing, substantially as set forth.

8. The combination with a vertical shaft and a steel step in the lower end of the shaft, of a two-part base or casting, the one fitting the other, and means for connecting the same and connecting the lower part to a suitable foundation, an outward and upward extending flange at the upper end of the upper portion of the casting forming an oil-receptacle, a steel block received in a recess in the lower part of the base or casting and intervening disks between the steel block and the step of the shaft, and means for supplying oil to the oil-receptacle, to the lower portion of the base or casting, and around the steel block, disks and shaft for the thorough lubrication of the parts, substantially as set forth.

9. The combination with a vertical shaft and a steel step in the lower end of the shaft, of a two-part base or casting the one fitting the other and means for connecting the same and connecting the lower part to a suitable foundation, an outward and upward extending flange at the upper end of the upper portion of the casting forming an oil-receptacle, a steel block received in a recess in the lower part of the base or casting and intervening disks between the steel block and a step of the shaft, and means for supplying oil to the oil-receptacle, to the lower portion of the base or casting and around the steel block, disks and shaft, for the thorough lubrication of the parts, and a bushing surrounding the shaft within the upper portion of the base or casting and having longitudinal grooves and perforations in the grooves and the lower end of the shaft provided with a spiral groove to facilitate the oiling of the parts and to insure a circulation of the oil, substantially as set forth.

10. The combination with a vertically-supported shaft, of the two-part base $a\ a'$ fitting one another and means for connecting the same and for connecting the part $a'$ to a foundation, an outward and upward extending or rising flange 3 at the upper end of the base $a$, a pulley mounted upon the shaft above the base, webs 9 formed integral with the pulley and between the arms thereof and a hood 17 formed integral with the pulley and the webs and extending downward from the webs and surrounding the flange 3 as a cover to the oil-receptacle to keep foreign materials out of the oil-receptacle, substantially as set forth.

11. In a device for oiling and cooling the bearings of vertical shafts, the combination with the step or shaft casting $a$ formed hollow or with an annular recess 4, inlet and exit pipes 5 6 for cooling-water, an oil-receptacle $z$ at the upper end of the base $a$, an oil cup and pipe therefrom to the oil-receptacle, a pipe entering the lower portion of the casting or base adjacent to the lower end of the shaft and a regulating-cock therein, a vertical pipe connecting the latter pipe and the former pipe from the oil-cup and a regulating-cock therein, and means providing passage-ways for the oil around the base of the shaft and around the shaft between the base and the oil-receptacle and for insuring a circulation of the oil whereby said parts are filled with oil, the movements of the same are controlled and foreign materials are drawn off, substantially as set forth.

12. In a device for oiling and cooling the bearings of vertical shafts, the combination with the two-part base or casting $a\ a'$ and the shaft, of a steel block $f$ received and non-rotatable in a recess fitting the same in the face of the part $a'$, said block having a central opening and grooved edges and the recess in the base $a'$ having X-grooves in the surface and curved sides forming passage-ways around the block $f$, and the disks $h\ i$ upon the surface of the block $f$ and between the same and the base of the shaft having convex faces and central perforations and grooves upon one face, the said grooves and perforations forming passage-ways for circulating oil, substantially as set forth.

Signed by us this 11th day of January, 1902.

JAMES H. BAKER.
GEO. F. SHEVLIN.
FREDERICK H. BAKER.

Witnesses:
CHARLES M. DAVISON,
NELLIE E. McCARTLY.